United States Patent
Momiyama

4,165,151
Aug. 21, 1979

[54] TWO-REFLECTING CATADIOPTRIC OPTICAL SYSTEM

[75] Inventor: Kikuo Momiyama, Yokohama, Japan

[73] Assignee: Canon Kabushiki Kaisha, Tokyo, Japan

[21] Appl. No.: 806,507

[22] Filed: Jun. 14, 1977

[30] Foreign Application Priority Data

Jun. 19, 1976 [JP] Japan .................................. 51/71696

[51] Int. Cl.² ............................................... G02B 17/00
[52] U.S. Cl. .................................................. 350/201
[58] Field of Search ................................ 350/199, 201

[56] References Cited

U.S. PATENT DOCUMENTS

| | | | |
|---|---|---|---|
| 3,490,831 | 1/1970 | Takahashi | 350/201 |
| 3,507,556 | 4/1970 | Shimizu | 350/201 |
| 4,106,855 | 8/1978 | Coon | 350/201 |

*Primary Examiner*—Conrad J. Clark
*Attorney, Agent, or Firm*—Toren, McGeady and Stanger

[57] ABSTRACT

The present invention relates to a catadioptric optical system provided with two-reflecting surfaces, or a reflecting-refractive type objective. A two-reflecting catadioptric optical system includes a front positive lens having a front surface of which the radius of curvature is smaller than that of a rear surface thereof, a negative meniscus lens positioned on the image side of said front positive lens in axially aligned relation thereto, having a front surface concave toward the front, and having a rear surface provided with a mirrored portion surrounding a light-permeable region, a positive meniscus lens convex toward the front and arranged between said front positive lens and said negative meniscus lens, a convex mirror facing to the rear and arranged between said front positive lens and said positive meniscus lens, a negative lens cemented together with the front surface of said negative meniscus lens, and a positive lens cemented together with the rear surface of the negative meniscus lens at the light-permeable region thereof.

3 Claims, 8 Drawing Figures

FIG.1
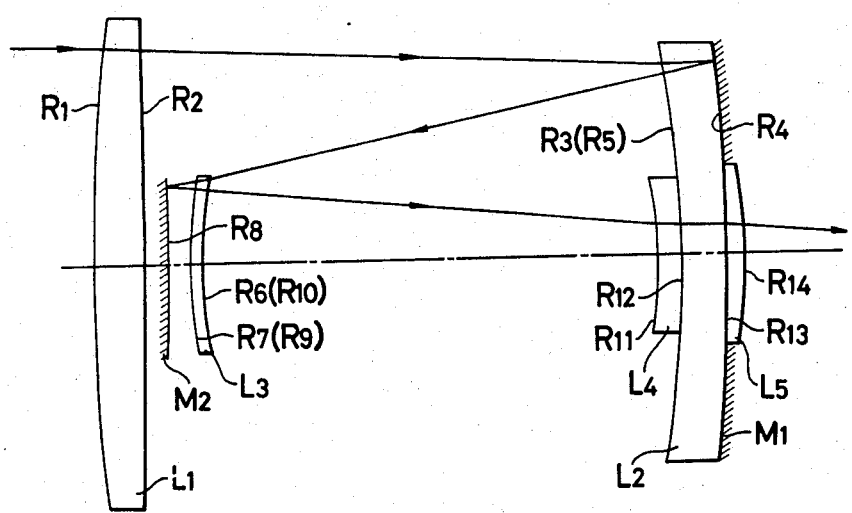
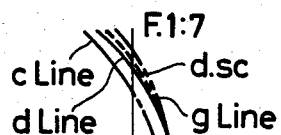
FIG.2A FIG.2B FIG.2C
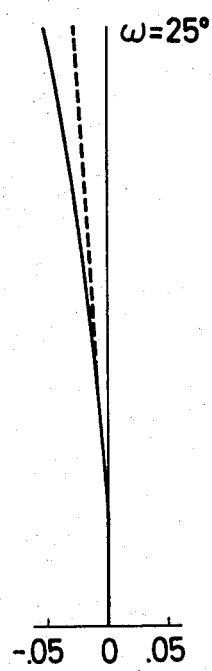
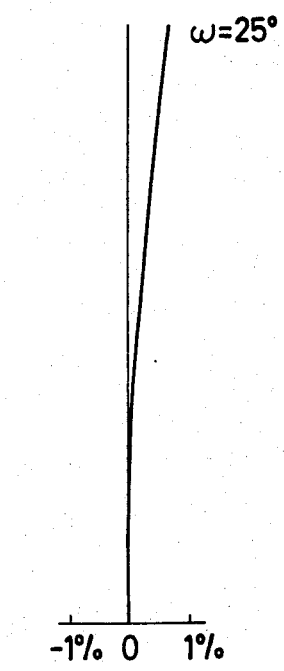
Spherical Aberration
Sine Condition
Astigmatism
Distortion Aberration Spherical Aberration
Sine Condition Astigmatism Distortion Aberration

4,165,151

TWO-REFLECTING CATADIOPTRIC OPTICAL SYSTEM

BACKGROUND OF THE INVENTION

This invention relates to a catadioptric lens system having two reflecting surfaces, and, more particularly, to improvements of such system.

The catadioptric lens system has advantages over the dioptric lens system in that chromatic aberrations tend to be produced in a smaller degree, and that the physical length of the system can be remarkably shortened in the longitudinal direction. The general construction of the catadioptric lens system of the type described involves a front refracting lens, a primary mirror, a secondary mirror, and a rear refracting lens. This rear lens is required to achieve good correction of aberrations and the shortening of the physical length. For the support of this lens, in many cases, the primary mirror is utilized with the provision of a central hole bored therein. In machining the mirror to produce the hole, however, it is difficult to effect a sufficiently high dimensional control, while economically maintaining a production run of bored mirrors. To overcome this drawback, the primary mirror may be constructed with advantage to provide a lens in the central region thereof to which the rear refracting lens is to be cemented, as, for example, disclosed in Japanese Patent Application Publication No. Sho 47-1909.

SUMMARY OF THE INVENTION

The present invention has for a general object to provide a catadioptric lens system which is well corrected for the various aberrations despite the reduction of the degree of freedom for correction of the various aberrations of the rear lens, as the primary mirror is made light-permeable in a central region thereof to constitute part of the rear lens in the cemented form.

BRIEF DESCRIPTION OF THE DRAWINGS

FIG. 1 is a schematic view of an Example 1 of one embodiment of a catadioptric lens system according to the present invention.

FIGS. 2A, 2B and 2C are graphic representations of the spherical aberration, astigmatism and distortion of the lens system of FIG. 1 respectively.

DESCRIPTION OF THE PREFERRED EMBODIMENT

Figure 3:
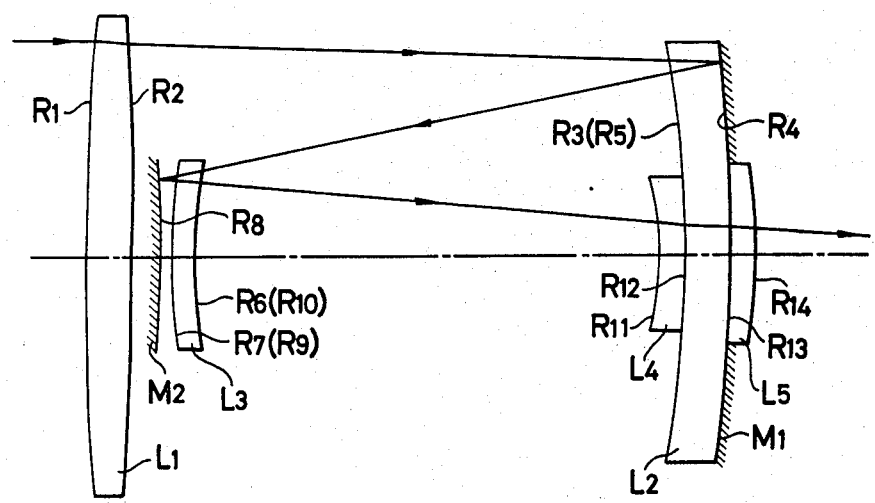
FIG. 3 is a schematic view of an Example 2 of the embodiment.
Figure 4A:
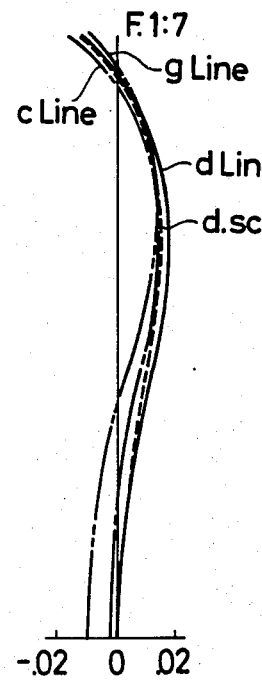
FIGS. 4A, 4B and 4C are graphic representations of the various aberrations of FIG. 3 system.
Figure 4B:
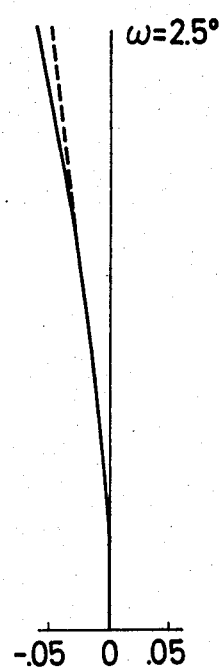
Figure 4C:
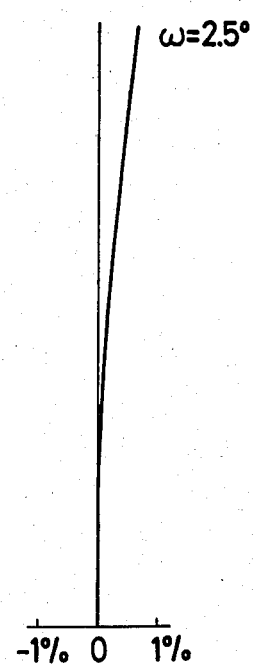

Referring to FIGS. 1 and 3, there is shown one embodiment of the catadioptric lens system comprising front and rear lens groups. The front group consists of a positive singlet $L_1$ having a front surface convex toward the front with a smaller radius of curvature than that of a rear surface thereof and a positive meniscus singlet $L_3$ of forward convexity. The rear group consists of a negative meniscus lens element $L_2$ of forward concavity, a front lens element $L_4$ cemented on the front surface of element $L_2$ in coaxial relation thereto and having so small a diameter that an outer annular zone of element $L_2$ can be utilized to provide a primary mirror $M_1$, and a rear lens element $L_5$ cemented on the rear surface of element $L_2$ in the central light-permeable region thereof. A secondary mirror $M_2$ of convex form toward the rear is arranged in a space between singlets $L_1$ and $L_3$. The singlets $L_1$ and $L_3$ and the secondary mirror $M_2$ are axially movable in unison for focusing purposes. The lens system is characterized by the following relationships:

(1) $0.3f < T.L < 0.4f$ (2) $0.18f < T.D < 0.25f$ $$\frac{0.45}{f} < \frac{1}{f_1} < \frac{0.65}{f} \quad (3)$$

$$0.3 < \left| \frac{R_1 + R_2}{R_1 - R_2} \right| < 1.8; \, R_1 > 0 \quad (4)$$

$$\frac{0.25}{f} < \frac{1}{f_3} < \frac{0.75}{f} \quad (5)$$

$$5. < \frac{R_6 + R_7}{R_6 - R_7} < 20.; \, R_6, R_7 > 0 \quad (6)$$

$$2. < \frac{R_{11} + R_{14}}{R_{11} - R_{14}} < 4.; \, R_{11}, R_{14} < 0 \quad (7)$$

(8) $0.2 < n_5 - n_4$ wherein f: the focal length of the entire system;
T.L: the length from the first lens surface to the image plane;
T.D: the length from the first to the final lens surface;
$f_1$: the focal length of the positive singlet $L_1$;
$f_3$: the focal length of the positive meniscus singlet $L_3$;
$R_1$: the radius of curvature of the front surface of the singlet $L_1$;
$R_2$: the radius of curvature of the rear surface of the singlet $L_1$;
$R_6$: the radius of curvature of the front surface of the positive meniscus singlet $L_3$;
$R_7$: the radius of curvature of the rear surface of the meniscus singlet $L_3$;
$R_{11}$: the radius of curvature of the front surface of the front lens element $L_4$;
$R_{14}$: the radius of curvatuve of the rear surface of the rear lens element $L_5$;
$n_4$: the index of refraction of a glass from which the front lens element $L_4$ is made up; and
$n_5$: the index of refraction of a glass from which the rear lens element $L_5$ is made up.

Condition (1) is given to determine the effective length of the lens system with focus at infinity. The upper limit provides for the compactness of the lens system which constitutes one feature of the invention. When the lower limit is violated, it is made difficult to achieve good correction of aberrations. Condition (2) is given to minimize the diameter of the central light-permeable region of the primary mirror $M_1$ under condition (1) when the upper limit is not exceeded. When the lower limit is violated, with refractive power of each of the lens elements is increased with increase in the aberrations. Condition (3) concerns the imparting of a suitable positive power to the front lens element or singlet $L_1$ under conditions (1) and (2) which makes a contribution to minimizing the outer diameters of the primary and secondary mirrors $M_1$ and $M_2$ and of the diameter of the second lens $L_2$ for the compactness of the lens system, as a bundle of image-forming light rays entering the first lens element $L_1$ is blocked at a central portion thereof by the secondary mirror $M_2$. When the lower limit is violated, this aim can not be achieved. When the upper limit is violated, coma and astigmatism tend to be over- and under-corrected respectively.

Since focusing is performed by moving the front lens group $L_1$, $L_3$ with the secondary mirror $M_2$, condition (4) is a compromise between requirements of minimizing variation of spherical aberration with focusing and of preventing over-correction of spherical aberration of the entire lens system under condition (3). These requirements are not fulfilled when the upper and lower limits are violated respectively. For a further improvement of residual spherical aberration under condition (4), there is provided the positive lens, in this instance, the positive meniscus singlet $L_3$ positioned adjacent the secondary mirror M to produce a negative spherical aberration which is balanced out by the positive spherical aberration so long as conditions (5) and (6) are fulfilled. When the lower limits of condition (5) and (6) are violated, compensation for the positive spherical aberration becomes difficult to perform. When the upper limit of condition (5) is violated, the Petzval sum is made unacceptable. When the upper limit of condition (6) is violated, coma and astigmatism are resulted in cover- and under-correction respectively. Conditions (7) and (8) make a contribution to an improvement of the Petzval sum which would be otherwise deteriorated under condition (5). For this reason, the power of each of the front and rear lens elements $L_4$ and $L_5$ in the rear lens group is increased with simultaneous selection of low and high index glasses for the concave and convex lens elements $L_4$ and $L_5$ respectively. When the lower limits of conditions (7) and (8) are violated, the improvement of Petzval sum can not be achieved, while when the upper limit of condition (7) is violated, over-correction of spherical aberration results.

The present invention is to provide a catadioptric lens system amenable to relatively low unit cost production techniques and having a physical length (from the front vertex to the focal plane) not exceeding 40% of the focal length of the system with the diameter of the primary mirror minimized to create compactness. In addition thereto, the blocking of a central portion of the light bundle is limited to less than 50% in diameter so that the introduction of defocusing can produce a pleasing effect, and so that the extent to which the image quality is deteriorated by diffraction is minimized.

Two specific examples of the catadioptric lens system may be constructed in accordance with the numerical data given in the following tables in which R is the radii of curvature of the refracting and reflecting surfaces; d is the axial separations between the successive surfaces; n is the indices of refraction of the various lens elements; and v is the Abbe numbers of the various lens elements.

EXAMPLE 1

Table 1 f = 100

| Lens | R | d | n | v |
|---|---|---|---|---|
| $L_1$ | $R_1 = 79.634$ | $d_1 = 1.6$ | $n_1 = 1.51633$ | $v_1 = 64.1$ |
|  | $R_2 = 688.07$ | $d_2 = 18.239$ |  |  |
| $L_2$ | $R_3 = -39.820$ | $d_3 = 1.6$ | $n_2 = 1.51633$ | $v_2 = 64.1$ |
|  | $R_4 = -59.081$ |  | (Reflecting surface of $M_1$) |  |
|  |  | $d_4 = 1.6$ | $n_3 = 1.51633$ ($-n_2$) | $v_3 = 64.1$ ($-v_2$) |
|  | $R_5 = -39.820$ (=$R_3$) | $d_5 = 16.039$ |  |  |
| $L_3$ | $R_6 = 22.407$ | $d_6 = 0.6$ | $n_4 = 1.51633$ | $v_4 = 64.1$ |
|  | $R_7 = 19.589$ | $d_7 = 0.6$ |  |  |
| $M_2$ | $R_8 = -38.555$ |  | (Reflecting surface of $M_2$) |  |
|  |  | $d_8 = 0.6$ |  |  |
| $L_3$ | $R_9 = 19.589$ (=$R_7$) | $d_9 = 0.6$ | $n_5 = 1.51633$ (=$n_4$) | $v_5 = 64.1$ (=$v_4$) |
|  | $R_{10} = 22.407$ (=$R_6$) | $d_{10} = 15.239$ |  |  |
| $L_4$ | $R_{11} = -10.218$ | $d_{11} = 0.8$ | $n_6 = 1.51633$ | $v_6 = 64.1$ |
|  | $R_{12} = -39.820$ (=$R_3$=$R_5$) |  |  |  |
| $L_2$ |  | $d_{12} = 1.6$ | $n_7 = 1.51633$ (=$n_2$=$n_3$) | $v_7 = 64.1$ (=$v_2$=$v_3$) |
|  | $R_{13} = -59.081$ (=$R_4$) |  |  |  |
| $L_5$ |  | $d_{13} = 0.6$ | $n_8 = 1.8061$ | $v_8 = 40.9$ |
|  | $R_{14} = -20.933$ |  |  |  |

Table 2

Numerical values of the parameters defined in the relationships

| | |
|---|---|
| (1) = 0.3589 | (5) = 0.355 |
| (2) = 0.220 | (6) = 14.905 |
| (3) = 0.574 | (7) = 2.907 |
| (4) = 1.263 | (8) = 0.290 |

Table 3

Aberrational Coefficients

| Rno | I | II | III | P | V |
|---|---|---|---|---|---|
| 1 | 0.4446 | −0.024311 | 0.001329 | 0.427597 | −0.023450 |
| 2 | 0.0534 | −0.170295 | 0.542328 | −0.049488 | −1.569521 |
| 3 | −5.7701 | 5.971680 | −6.180221 | −0.855130 | 7.281038 |
| 4 | 5.2723 | −6.701879 | 8.519024 | −2.232522 | −7.991021 |

Table 3-continued
Aberrational Coefficients

| Rno | I | II | III | P | V |
|---|---|---|---|---|---|
| 5 | 0.5854 | −1.249035 | 2.664567 | −0.855130 | −3.860075 |
| 6 | −16.7867 | 11.391598 | −7.730423 | −1.519604 | 6.277138 |
| 7 | 19.7275 | −12.369500 | 7.755874 | 1.738251 | −5.952968 |
| 8 | −2.9103 | 4.023232 | −5.561643 | 5.187529 | 0.517169 |
| 9 | −0.0366 | −0.159719 | −0.696198 | 1.738251 | 4.542186 |
| 10 | 0.0083 | 0.096142 | 1.113589 | −1.519604 | −4.702794 |
| 11 | −1.1736 | −0.649345 | −0.359269 | −3.332481 | −2.042567 |
| 12 | 0. | 0. | 0. | 0. | 0. |
| 13 | −0.0100 | 0.042372 | −0.179255 | −0.179093 | 1.503332 |
| 14 | 0.3275 | −0.131926 | 0.053139 | 2.131554 | −0.879976 |
| Σ | −0.2682 | 0.069014 | −0.056159 | 0.680128 | −6.901510 |

EXAMPLE 2

Table 4
f = 100

| | | | | |
|---|---|---|---|---|
| $L_1$ { $R_1$ = 111.596 | $d_1$ = 1.6 | $n_1$ = 1.51633 | $\nu_1$ = 64.1 |
| $R_2$ = −395.300 | | | |
| | $d_2$ = 18.595 | | |
| $L_2$ { $R_3$ = −39.272 | $d_3$ = 1.6 | $n_2$ = 1.51633 (Reflecting surface of $M_1$) | $\nu_2$ = 64.1 |
| $R_4$ = −59.747 | $d_4$ = 1.6 | $n_3$ = 1.51633 (=$n_2$) | $\nu_3$ = 64.1 (= $\nu_2$) |
| $R_5$ = 39.272 | (=$R_3$) | | |
| | $d_5$ = 16.395 | | |
| $L_3$ { $R_6$ = 24.903 | $d_6$ = 0.8 | $n_4$ = 1.51633 | $\nu_4$ = 64.1 |
| $R_7$ = 20.602 | | | |
| | $d_7$ = 0.4 | | |
| $M_2$  $R_8$ = −39.052 | | (Reflecting surface of $M_2$) | |
| | $d_8$ = 0.4 | | |
| $R_9$ = 20.602 (=$R_7$) | | | |
| $L_3$ { | $d_9$ = 0.8 | $n_5$ = 1.51633 (=$n_4$) | $\nu_5$ = 64.1 |
| $R_{10}$ = 24.903 (=$R_6$) | | | |
| | $d_{10}$ = 15.595 | | |
| $L_4$ { $R_{11}$ = −10.218 | $d_{11}$ = 0.8 | $n_6$ = 1.51633 | $\nu_6$ = 64.1 |
| $R_{12}$ = −39.272 (=$R_3$=$R_5$) | | | |
| $L_2$ { | $d_{12}$ = 1.6 | $n_7$ = 1.51633 (=$n_2$=$n_3$) | $\nu_7$ = 64.1 (=$\nu_2$=$\nu_3$) |
| $R_{13}$ = −59.747 (=$R_4$) | | | |
| $L_5$ { | $d_{13}$ = 0.8 | $n_8$ = 1.8061 | $\nu_8$ = 40.9 |
| $R_{14}$ = −21.595 | | | |

Table 5

| | |
|---|---|
| (1) = 0.359 | (5) = 0.460 |
| (2) = 0.226 | (6) = 10.582 |
| (3) = 0.593 | (7) = 2.796 |
| (4) = 0.560 | (8) = 0.290 |

Table 6

| Rno | I | II | III | P | V |
|---|---|---|---|---|---|
| | 0.1615 | 0.043226 | 0.011563 | 0.305131 | 0.084720 |
| 2 | 0.2777 | −0.563213 | 1.142156 | 0.086140 | −2.490898 |
| 3 | −6.0270 | 6.170251 | −6.316817 | −0.867064 | 7.354525 |
| 4 | 5.0067 | −6.395202 | 8.168707 | −2.207587 | −7.614244 |
| 5 | 0.4286 | −1.007571 | 2.368285 | −0.867064 | −2.528604 |
| 6 | −14.3650 | 9.929513 | −6.863545 | −1.367375 | 5.689433 |
| 7 | 17.8922 | −11.081244 | 6.862983 | 1.652787 | −5.274099 |
| 8 | −2.8116 | 3.881671 | −5.358817 | 5.121332 | 0.327859 |
| 9 | −0.0327 | −0.149689 | −0.683208 | 1.652787 | 4.425335 |
| 10 | 0.0012 | 0.039690 | 1.217252 | −1.367375 | −4.604081 |
| 11 | −1.1131 | −0.670817 | −0.404253 | −3.332481 | −2.251863 |
| 12 | 0. | 0. | 0. | 0. | 0. |
| 13 | −0.0104 | 0.04333 | −0.179057 | −0.177092 | 1.471650 |
| 14 | 0.2938 | −0.127447 | 0.055278 | 2.066786 | −0.920408 |
| Σ | −0.2982 | 0.112501 | 0.020526 | 0.698924 | −7.330677 |

What is claimed is:

1. A two-reflecting catadioptric optical system including:
    a front positive lens having a front surface whose radius of curvature is smaller than that of a rear surface thereof;
    a negative meniscus lens positioned on the image side of said front positive lens in coaxial relation thereto, having a front surface concave toward the front and having a rear surface provided with a mirrored portion surrounding a light-permeable region;
    a positive meniscus lens of forward convexity positioned between said front positive lens and said negative meniscus lens;
    a convex mirror of rearward convexity positioned between said front positive lens and said positive meniscus lens, apart from said positive meniscus lens; and
    a negative lens cemented onto the front surface of said negative meniscus lens and a positive lens cemented onto the rear surface of said negative meniscus lens in the light-permeable region.

2. A two-reflecting catadioptric optical system according to claim 1, wherein said front positive lens, said convex mirror and positive meniscus lens are axially movable for focusing purposes.

3. A two-reflecting catadioptric optical system according to claim 1, said system being arranged to satisfy the following condition:

$$\frac{0.25}{f} < \frac{1}{f_3} < \frac{0.75}{f}$$

wherein $f_3$ represents the focal length of said positive meniscus lens and $f$ the focal length of the whole system.